Figure 1:
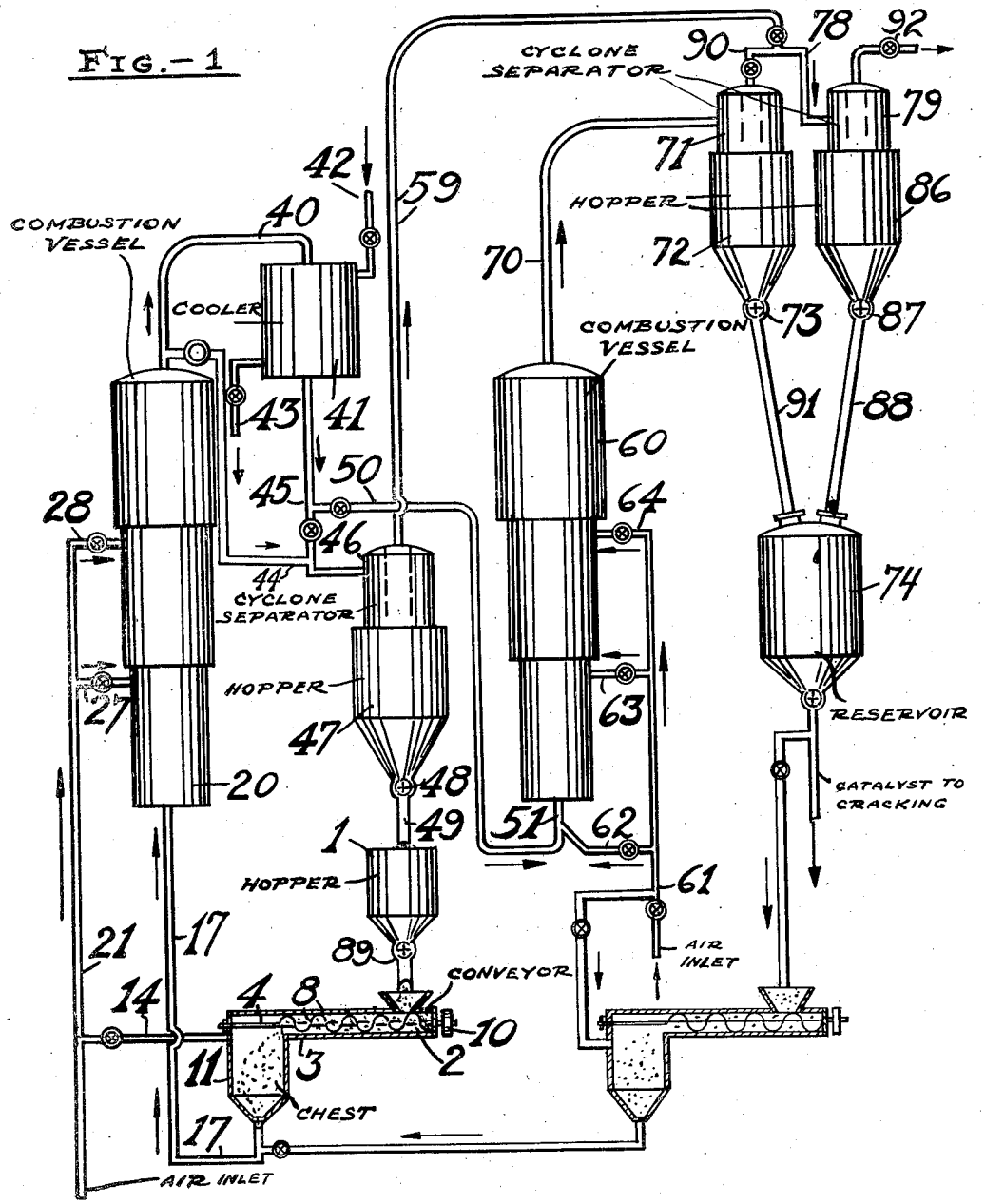

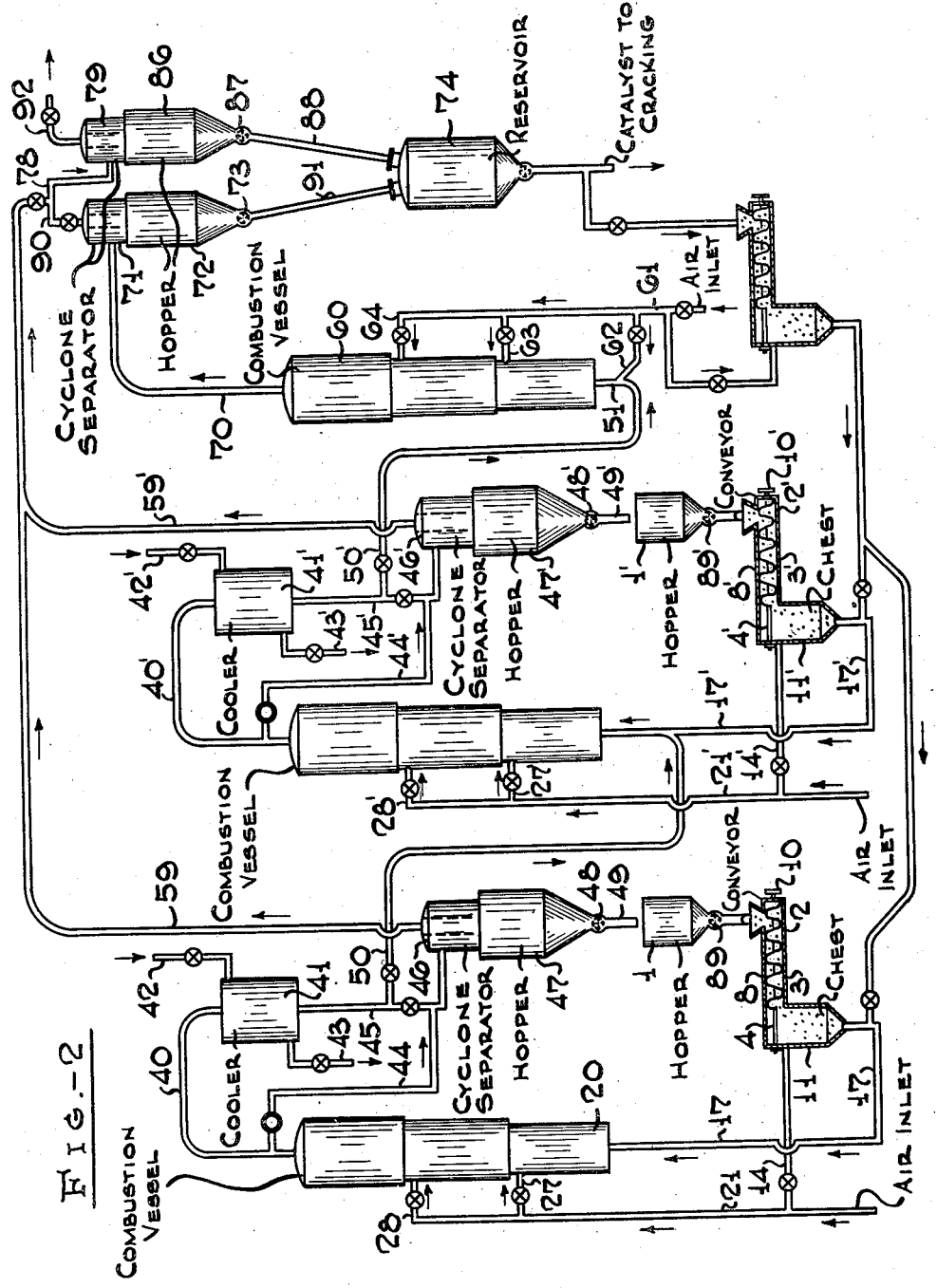

Patented Mar. 11, 1947

2,417,275

UNITED STATES PATENT OFFICE 2,417,275

REGENERATION OF POWDERED CATALYST

William I. Thompson, Elizabeth, and Donald L. Campbell, Short Hills, N. J., assignors to Standard Oil Development Company, a corporation of Delaware Continuation of application Serial No. 345,728, July 16, 1940. This application January 31, 1941, Serial No. 376,928

4 Claims. (Cl. 252—242)

The present application is a continuation of our prior application Serial No. 345,728, filed July 16, 1940.

The present invention relates to improvements in the art of reactivating or regenerating solid catalytic materials containing carbonaceous deposits by means of combustion of the catalyst contaminants. It pertains more particularly to a method of regenerating such catalyst in finely divided form. This catalyst may, for example, be a powdered catalyst, such as an acid-treated clay, a silica gel, or a plural gel, such as silica-alumina gel or alumina-silica composition which has been used in contact with relatively high boiling hydrocarbons, such as gas oil, to cause catalytic conversion of said hydrocarbons into products boiling within the gasoline range. More particularly, it is directed to an improvement on a method for regenerating a catalyst of the type indicated, which is in a powdered form and suspended in a free oxygen-containing gas which causes oxidation of the catalyst contaminants under proper temperature conditions.

It is, of course, well-known that when an acid-treated clay is contacted with a hydrocarbon oil under suitable conditions of temperature, pressure, time of contact, and intimacy of mixing, for example, where a gas oil is cracked in the presence of an acid-treated clay, the process results in the deposition of carbonaceous materials upon the catalyst. These contaminants impair the activity of the catalyst and must be removed periodically.

Our present invention is concerned, as indicated, with the regenerating of a contact catalyst by burning or oxidizing the contaminants under closely controlled conditions of time of contact, temperature, pressure, and intimacy of mixing and handling of the catalyst so as to prevent overheating or baking of the catalyst or otherwise injuring its activity. It is generally known in the art that a catalyst such as a clay catalyst cannot be subjected for a considerable length of time to a temperature above 1100° F., certainly not above 1200° F., without permanently injuring the catalyst. It is also known that catalyst of the type indicated can be regenerated without injury by suspending the fouled catalyst in air or a mixture of oxygen with other gases at a temperature above that at which combustion proceeds with reasonable rapidity, where the oxygen is present only in sufficient quantity to raise the temperature of the suspension, when combustion of the oxygen is substantially complete, to 1100° F. or less, by passing the suspension, after combustion of the oxygen originally present is substantially complete, through a heat exchanger for indirect removal of heat into a cooling medium; and by further alternate additions of oxygen and removals of heat until regeneration is complete. The method for carrying out this latter mentioned process was described in U. S. Patent 2,320,273, granted May 25, 1943.

However, two undesirable features of this alternate combustion and cooling regeneration of powdered catalyst in a stage-wise continuous operation are that the combustion zones required are relatively large and that in certain cases a large number of stages is required. For example, when the carbonaceous deposits are allowed to accumulate to the extent that the amount which must be removed to restore activity is of the order of magnitude of 2% by weight based on the catalyst, then to limit the temperature rise in each combustion stage to, say, 150° F., it is necessary to operate the process described in the above-mentioned patent in nine stages. (The limitation to 150° F. temperature rise is desirable in order to insure combustion at a reasonably high rate at the entrance to the combustion zone due to beginning the combustion at at least a certain minimum temperature while avoiding the corresponding maximum temperature not over 150° F. higher at the outlet of the combustion zone in order to prevent injury to the catalyst.) This multiplicity of stages, of course, increases the investment cost and adds to the complexity of the operation of the unit.

An object of the present invention is to provide an improved method for the continuous regeneration of fouled catalyst in alternate combustion and cooling stages.

A further object is to accomplish the above-mentioned improvement in such a way as to reduce the time, and therefore the volume, required for combustion in each of the stages and to reduce the number of stages required.

Another object of this invention is to provide an improved method for burning or oxidizing the contaminants on a catalyst which has been used to convert hydrocarbon oil into hydrocarbons in the gasoline boiling range.

While the invention in some of its broader phases may have a more general application, it is particularly suitable for the regeneration of finely divided catalyst masses containing carbonaceous deposits resulting from the high temperature conversion of hydrocarbon oils, such as in catalytic cracking, reforming, viscosity reducing processes and the like, by means of contacting the said hydrocarbon oils with catalysts in finely divided form in a continuous process.

A further object of our invention is to provide an improved continuous method of regenerating finely divided catalytic agents, which method is more economical than those heretofore employed.

It will be apparent that in a stage-wise regeneration system, recycling catalyst from which only part of the carbonaceous deposits have been burned from the outlet of any stage to the inlet of the same stage or of any preceding stage will reduce the time of suspension required to burn the contaminated catalyst to the extent required to restore its activity sufficiently for further use. An object of this invention is to improve the process of regenerating a contaminated finely divided catalyst by reducing the time of residence of the suspension of this catalyst in a series of combustion vessels by recycling the catalyst from which only a portion of the contaminated deposits has been burned from the outlet of one combustion vessel to the inlet of the same or a preceding vessel.

Furthermore, it will be apparent that recycling of catalyst tends to increase the heat capacity of the regeneration suspension so that for combustion of a given weight of carbonaceous deposit there is less temperature rise in the suspension. This tends to decrease the number of regeneration stages required, in that more combustion can be effected in each stage within the limit set by the previously mentioned desirable limit in temperature rise. To put it another way, if hot catalyst is recycled the suspension from a previous stage can be maintained at a lower temperature while maintaining the same inlet temperature necessary for combustion in the succeeding combustion zone, and in this succeeding combustion zone more combustion can be effected without raising the temperature of the suspension above the limit beyond which injury to the catalyst would occur. An object of this invention is to reduce the number of stages required in regenerating fouled catalyst by recycling catalyst, without necessarily cooling said catalyst, to the inlet of the same regeneration stage or to a preceding regeneration stage.

The general object of our invention is to regenerate a fouled catalyst suspended in a regeneration gas containing only a portion of the oxygen required for complete regeneration, to remove the suspension from a combustion zone, to cool the suspension, to separate catalyst from said suspension to return a portion of said separated catalyst to said combustion zone, re-suspend the remainder of said catalyst in regeneration gas containing oxygen, to pass the re-suspension through a second combustion zone and cooler, and to repeat the process in stages until regeneration is completed.

Another object of our invention is to regenerate a fouled catalyst suspended in a regeneration gas containing only a portion of the oxygen required for complete regeneration, to remove the suspension from the combustion zone, to cool the suspension, to segregate a portion of said suspension, to separate the catalyst from said segregated portion, to return said separated catalyst to said combustion zone, to withdraw the gaseous products of combustion from said segregated portion of suspension through suitable catalyst recovery means, and to add oxygen containing gas to the remainder of said suspension in order to make ready a charge for a second combustion zone.

A further object of this invention is to regenerate a fouled catalyst in a continuous stagewise alternate combustion and cooling process in which the combustion takes place with the catalyst suspended in a regeneration gas, and to return a portion of the regenerated catalyst, without cooling after the last combustion stage, to the first combustion stage.

The objects of the present invention may be accomplished in the apparatus shown in the accompanying drawing in which Fig. 1 illustrates diagrammatically a combination of apparatus elements in which the regeneration process may be performed according to a preferred embodiment of the invention. Figure 2 illustrates an apparatus suitable for carrying out a further modification of a regeneration process in accordance with the present invention.

Our invention will now be more specifically described with reference to the accompanying drawing. Referring particularly to Figure 1, the reference character 1 designates a hopper to which is added the material to be regenerated. This material is preferably in finely divided form and may comprise, for example, naturally active or activated adsorbent clays or synthetic adsorbent materials of the same or different composition. This material, contaminated with carbonaceous deposits, may be continuously withdrawn from the hopper 1 by means of a feeding mechanism, such as a star feeder 89, and discharged into a suitable transfer mechanism, such as a screw conveyor 2. The latter may consist essentially of a casing 3 within which is axially disposed a shaft 4 carrying a screw 8. Said screw may in some cases be of the compression type. On a projection of shaft 4 there is securely mounted a driven member 10, such as a pulley, which may be in communication with suitable driving means, such as a steam turbine (not shown), which driving means in operation will cause the shaft 4 to rotate and with it the screw 8, thus causing catalyst in the casing to be discharged into a chest 11. Air or other free-oxygen-containing regeneration gas is introduced through line 14 into said chest and forms within the chest a suspension of the catalyst in the regeneration gas. From chest 11 the suspension is withdrawn through line 17, and then forced into the lower-most section of combustion vessel 20, in which it passes upwardly toward the outlet at the top. As shown, the combustion vessel consists of three superimposed telescoping cylinders with the cylinder of the greatest diameter at the top. Additional air or other oxygen containing gases are added to the combustion vessel through line 21 and branch lines 27 and 28 at the inlets to the middle and upper-most cylinders, respectively, in such a manner as to insure mixing of this additional gas with the suspension.

A suspension of partially regenerated catalyst in the vaporous products from the partial combustion of the catalyst is withdrawn from the top of the combustion vessel through line 40 and passed downwardly through a cooler 41 where a portion of the sensible heat is abstracted by heat exchange with a cooling medium introduced through line 42 and withdrawn through line 43. This cooling medium may be, for example, the hydrocarbon oil fed to the catalyst conversion unit or it may be a heat transfer medium from which the heat is removed in other apparatus (not shown) for the generation of steam or for other purposes. The cooled suspension is withdrawn through line 45 and a portion of it is passed into a cyclone separator 46, wherein the major portion of the catalyst is removed from the gases and withdrawn from the bottom of the cyclone separator into hopper 47 and thence discharged through star feeder 48 and line 49 into hopper 1, wherein it is mixed with the catalyst to be regenerated.

As an alternative to discharging hopper 47 into hopper 1, the catalyst in hopper 47 may be discharged through star feeder 48 into a transfer means similar to that used to discharge hopper 1, and the catalyst thus transferred may be suspended in a separate stream of air or other oxygen-containing gas and thereafter mixed with the suspension passing through line 17.

The gaseous products of combustion separated from the major portion of the catalyst in cyclone separator 46 may be conducted through lines 59 and 78 into cyclone separator 79 for removal of the residual catalyst suspended therein.

The cooled suspension not passed into the cyclone separator 46 may be withdrawn from line 45 through line 50, mixed with air from line 62 in line 51, and discharged into a second combustion vessel 60 in which it passes upwardly toward the outlet at the top.

Alternatively, the whole of the suspension leaving the cooler 41 through line 45 may be passed through the cyclone separator 46. In this case, the major portion of the catalyst is separated from said suspension in said cyclone separator and withdrawn into hopper 47, the separated gas containing residual catalyst being withdrawn as before through line 59. The catalyst is then withdrawn from hopper 47 through two parallel sets of transfer means, each set including a star feeder and a conveyor, or other alternate means, and one portion is admixed with air or other oxygen-containing gas and returned to the combustion vessel 20, while the other portion is admixed with air or other oxygen-containing gas and discharged into combustion vessel 60.

The flow of suspension through combustion vessels 20 and 60 may alternatively be down rather than upflow, the latter being the preferential direction. Also, the flow of the suspension in the cooler 41 may be up rather than down.

As an alternative to cyclone separator 79, two or more cyclone separators in series may be employed or an electrical precipitator or combination of cyclones and electrical precipitator may be used.

In combustion vessel 60 additional air or other oxygen containing gas is added through line 61 and branch lines 63 and 64 at the inlets to the middle and uppermost of three superimposed successively wider cylinders, respectively, of which the cylinder of greatest diameter is at the top.

The regeneration of the catalyst may be completed in combustion vessel 60 in which case the suspension is withdrawn from the top of said combustion vessel through line 70 into cyclone separator 71. Therein the major portion of the regenerated catalyst is withdrawn from the products of combustion and passes downward into hopper 72, from which it can be withdrawn through star feeder 73 and line 91 into reservoir 74 for storage prior to its use as a catalyst in a catalytic conversion process.

The gaseous products of combustion are withdrawn from cyclone separator 71 through lines 90 and 78 into cyclone separator 79 in which the residual suspended catalyst is removed, together with the residual suspended catalyst from the gas withdrawn from cyclone separator 46. The gases withdrawn from cyclone separator 79 pass through control valve 92 which makes it possible to maintain the desired pressure of regeneration in combustion vessels 20 and 60.

The catalyst recovered in cyclone separator 79 is withdrawn through hopper 86, star feeder 87, and line 88 into reservoir 74 where it is mixed with the above mentioned major portion of the regenerated catalyst.

Also, a portion of the catalyst in reservoir 74 may be withdrawn through a transfer means, including a star feeder and a conveyor similar to those shown for withdrawing catalyst from hopper 1, or other alternate means, and suspended in air or other oxygen-containing gas and mixed with the suspended discharge from hopper 1 in line 17 for return to combustion vessel 20.

In case the regeneration is not completed in combustion vessel 60, the suspension in line 51, instead of being discharged into a combustion vessel like 60 followed immediately by a final set of catalyst separation means, would be discharged through any necessary number of stages, each of which includes a combustion vessel similar to combustion vessel 20, a cooler similar to cooler 41, and a cyclone separator similar to cyclone separator 46, suitably disposed and arranged with transfer means for recycling catalyst from the outlet of the cooler to the inlet of the combustion zone. From the last of these stages, the suspension would be discharged through a final combustion vessel similar to 60, immediately followed by a final set of catalyst separating means similar to cyclone separators 71 and 79, hoppers 72 and 86, star feeders 73 and 87, lines 91 and 88, and reservoir 74. An apparatus for carrying out the modified process just described is diagrammatically illustrated in Figure 2 of the drawings, which represents a regeneration system comprising three regeneration stages and two cooling stages 40 and 40'. In this figure, parts corresponding to those in Figure 1 are designated by the same numerals and the parts in the additional regeneration stage have primes applied to them.

The gaseous products of combustion withdrawn from cyclone separator 79 may be used to supply energy by expansion in a turbine or by indirect heat exchange in a waste heat boiler or in some similar manner before they are discharged to the atmosphere.

The purpose of admitting the air or other oxygen containing gas into combustion vessels 20 and 60 at three points, namely, the bottom inlet, the entrance to the middle cylinder, and the entrance to the uppermost cylinder, is to permit reducing the volume of each of these vessels. This is due to the experimentally determined fact that the time of residence of the suspension in a vessel is not materially affected by the amount of oxygen present so long as the oxygen concentration is 2% or greater, and, since the volume required is roughly proportional to the time of residence required, the volume can be reduced by adding the oxygen containing gas only as required. The diameters of the cylinders are varied to permit maintaining a substantially uniform velocity.

It will be understood, of course, that numerous other modifications of the process outlined above may be made without departing from the spirit of this invention. For example, partially regenerated catalyst may be withdrawn from any point in the system and returned uncooled and suspended in air to any previous point in the system.

Thus a portion of the suspension in line 40 may be passed through valved line 44 into line 45 and eventually into cyclone separator 46. In this modification the catalyst is recycled uncooled to the regeneration system.

It will, of course, be understood that the operating conditions prevailing in vessels 20 and 60 should be varied to suit a number of conditions, such as the kind and character of the catalyst, the temperature which it can stand without injury, the amount and character of the contaminants on the catalyst, and the degree to which these are to be removed to make the catalyst suitable for further use, and other factors. However, generally speaking we may say that the following conditions in the combustion vessels give good results:

Pressure from 1 to 30 atmospheres absolute.
Temperature of inlet air from atmospheric to 800° F.
Temperature of recycled catalyst from 400 to 1100° F.
Temperature of contaminated catalyst from 650° to 1000° F. (depending on temperature in catalytic conversion chamber).
Temperature of mixed suspension entering combustion vessel from 750 to 950° F.
Temperature of suspension leaving combustion vessel from 1000 to 1100° F.
Temperature rise in combustion vessel from 100 to 250° F.
Ratio of recycled catalyst to contaminated catalyst from 0.5:1 to 3:1.
Air or equivalent oxygen-containing gas used 2.5 to 3.5 cubic feet per minute under standard conditions/lb./hour of carbonaceous deposits to be burned from the catalyst.
Number of regeneration stages 2 to 5.

It is pointed out that the above described method for regenerating contact catalyst is applicable to contact masses which have been contaminated as a result of refining of mineral oils such as lubricating oils and gasoline, or animal and vegetable oils.

It is further pointed out that the precise form and arrangement of the apparatus shown in Fig. 1 is purely illustrative and does not impose any limitation whatever on the scope of our invention.

Having described the specific embodiments, it will be understood that the invention embraces such other variations and modifications as come within the spirit and scope thereof.

What is desired to be protected is:

1. In a method of regenerating finely divided powdered material contaminated with carbonaceous deposits which comprises suspending said material in a gaseous medium containing only sufficient oxygen to partially regenerate said material by combustion of said deposits, passing said suspension through a combustion zone under suitable conditions of temperature, pressure, and time of residence, removing said suspension from said combustion zone, cooling said suspension, and repeating the process with addition of oxygen-containing gas in each of several succeeding combustion zones until the desired regeneration is effected, and wherein the temperature rise in each combustion zone ranges from 100 to 250° F., the improvement which comprises removing the suspension from the last combustion zone, separating the regenerated catalyst therefrom, and withdrawing a portion of the regenerated catalyst and recycling it without cooling to the first combustion zone.

2. The method set forth in claim 1 in which the recycled catalyst is suspended in air before it is returned to the said combustion vessel.

3. In the method of regenerating finely divided powdered material contaminated with carbonaceous deposits which comprises suspending said material in a gaseous medium containing only sufficient oxygen to partially regenerate said material by combustion of said deposits, passing said suspension through a combustion zone under suitable conditions of temperature, pressure, and time of residence, removing said suspension from said combustion zone, cooling said suspension, and repeating the process with addition of oxygen-containing gas in each of several succeeding combustion zones until the desired regeneration is effected, the improvement which comprises withdrawing a part of the suspension from a portion of the regeneration system between a combustion vessel and a succeeding cooler, separating catalyst from the suspension and returning it to a previous portion of the regeneration system including a combustion zone.

4. The method set forth in claim 3 in which the recycled catalyst is suspended in air before return to the system.

WILLIAM I. THOMPSON.
DONALD L. CAMPBELL.

REFERENCES CITED

The following references are of record in the file of this patent:

UNITED STATES PATENTS

| Number | Name | Date |
| --- | --- | --- |
| 2,248,196 | Plummer | July 8, 1941 |
| 2,320,273 | Gohr et al. | May 25, 1943 |

FOREIGN PATENTS

| Number | Country | Date |
| --- | --- | --- |
| 127,245 | Switzerland | 1928 |